United States Patent
Huang

(10) Patent No.: US 8,009,214 B2
(45) Date of Patent: Aug. 30, 2011

(54) INDIVIDUAL ROW CALIBRATION IN AN IMAGE SENSOR

(75) Inventor: Steven Huang, Arcadia, CA (US)

(73) Assignee: Forza Silicon, Pasadena, CA (US)

( * ) Notice: Subject to any disclaimer, the term of this patent is extended or adjusted under 35 U.S.C. 154(b) by 312 days.

(21) Appl. No.: 11/762,685

(22) Filed: Jun. 13, 2007

(65) Prior Publication Data
US 2008/0309804 A1    Dec. 18, 2008

(51) Int. Cl.
H04N 5/335 (2011.01)
H03M 1/10 (2006.01)
H03M 1/34 (2006.01)

(52) U.S. Cl. .......... 348/302; 341/120; 341/163

(58) Field of Classification Search .......... 341/163, 341/120, 121; 348/294, 302, 308
See application file for complete search history.

(56) References Cited

U.S. PATENT DOCUMENTS

| | | | |
|---|---|---|---|
| 4,441,125 A | 4/1984 | Parkinson | |
| 5,105,276 A * | 4/1992 | Schrock | 348/241 |
| 5,563,723 A * | 10/1996 | Beaulieu et al. | 358/461 |
| 6,115,065 A | 9/2000 | Yadid-Pecht et al. | |
| 6,304,826 B1 | 10/2001 | Liu | |
| 6,359,575 B1 * | 3/2002 | Knudsen | 341/120 |
| 6,525,769 B1 * | 2/2003 | Thomas et al. | 348/241 |
| 6,534,757 B2 | 3/2003 | Inui et al. | |
| 6,787,749 B1 | 9/2004 | Zhou et al. | |
| 6,900,837 B2 | 5/2005 | Muramatsu et al. | |
| 2005/0270197 A1 * | 12/2005 | Smith et al. | 341/120 |
| 2006/0001921 A1 * | 1/2006 | Bailey et al. | 358/504 |
| 2006/0055577 A1 * | 3/2006 | Boemler | 341/155 |
| 2008/0252507 A1 * | 10/2008 | Gerfers et al. | 341/155 |

FOREIGN PATENT DOCUMENTS
JP      03104418 A  *  5/1991

* cited by examiner

*Primary Examiner* — Jason Whipkey
(74) *Attorney, Agent, or Firm* — Law Office of Scott C. Harris, Inc.

(57) ABSTRACT

A column parallel image sensor such as an active pixel sensor includes a calibration circuit for the readout circuit within the active pixel sensor. The calibration circuit produces a value that is stored and used to offset any noise in the A/D converter. The calibration is carried out each time that each row is read out so in effect the calibration's individual for each pixel. Hence, any noise within the calibration evens out within the image, and is effectively random within the image and hence becomes less noticeable within the image.

6 Claims, 2 Drawing Sheets

INDIVIDUAL ROW CALIBRATION IN AN IMAGE SENSOR

BACKGROUND

Image sensors may be formed in various different architectures. For example, MOS type image sensors using column parallel architectures are shown in U.S. Pat. Nos. 6,115,065 and 6,787,749. Such a column parallel architecture connects each of the pixels in one column in parallel to one unit of the output circuit. During readout, one pixel in each column is selected at each time, and at the same time as all the other pixels in the same row. This allows reading out an entire row of image sensor elements simultaneously. The read-out information is converted to digital and output simultaneously.

The structure which carries out the image acquisition includes noise. The fixed components of the noise creates a fixed pattern noise. The A/D converters in the readout circuit may contribute to the fixed pattern noise.

Patents such as U.S. Pat. Nos. 6,304,826; 6,534,757 and 6,900,837 describe different ways to handle that noise. One technique may carry out a single calibration per A/D converter, and create a calibration level that represents an offset attributable to that A/D converter. That offset is used to compensate for the noise in the A/D converter. The calibration may be carried out, for example, per frame and per A/D converter. However, there is still a residual fixed pattern noise, and the differences between the frames may still be noticeable. Patents such as U.S. Pat. No. 6,900,837 suggest moving the pixel assignments to mix up the noise to make it less noticeable.

SUMMARY

The present application defines a system which carries out calibration individually for each unit of pixels, e.g., a row, multiple rows, or some other amount.

BRIEF DESCRIPTION OF THE DRAWINGS

These and other aspects will now be described in detail with reference to the accompanying drawings, wherein.

DETAILED DESCRIPTION

The conventional wisdom in image sensor systems dictates that the readout circuit components such as the A/D converter produce fixed amounts of noise, and hence do not need to be frequently calibrated. The present inventors recognized however, that the noise itself is not fixed, and treating the noise as the fixed component is itself a source of fixed pattern noise.

Figure 1:
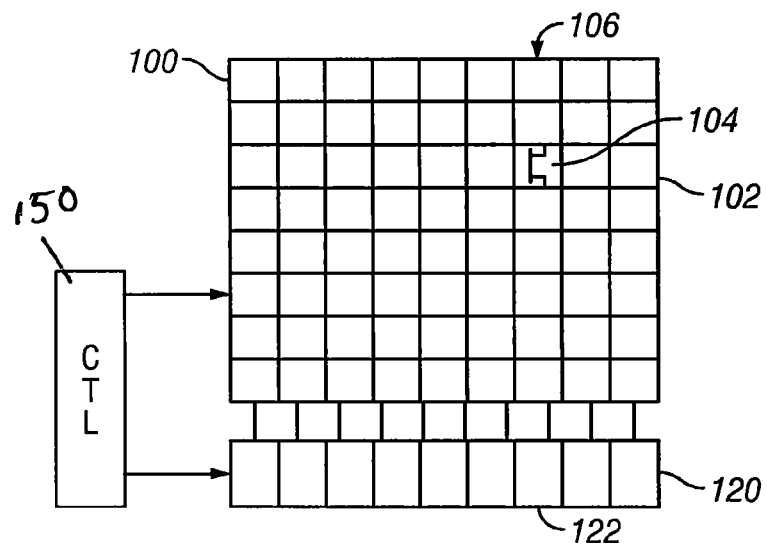
FIG. 1 shows overall block diagram of an embodiment in a column parallel structure.

An embodiment is illustrated in FIG. 1. An image sensor array 100 may include any kind of image sensor pixels, such as MOS image sensors and more specifically active pixel sensors. While other image sensor elements can be used, special advantages may be obtained from an active pixel type array.

The array is arranged in a column parallel architecture. This means that any one row such as row 102 can be selected for read out at any time. A readout circuit 120 includes a number of individual elements such as 122. Each individual readout circuit element is associated with an entire column. While only one pixel in the column is connected to the readout circuit at any time, all of the pixels in the column are in effect connected to that readout circuit.

The rows are selected for read out by activating a selection transistor 104 in any of the rows, to connect the output of the row to the readout circuit 120. In a system of this type, the time of readout of a single pixel is the same as time of the readout of a whole row.

For example, readout circuit 122 may be associated with column 106, and may process the readout of each individual pixel from column 106, at each row conversion time.

Figure 2:
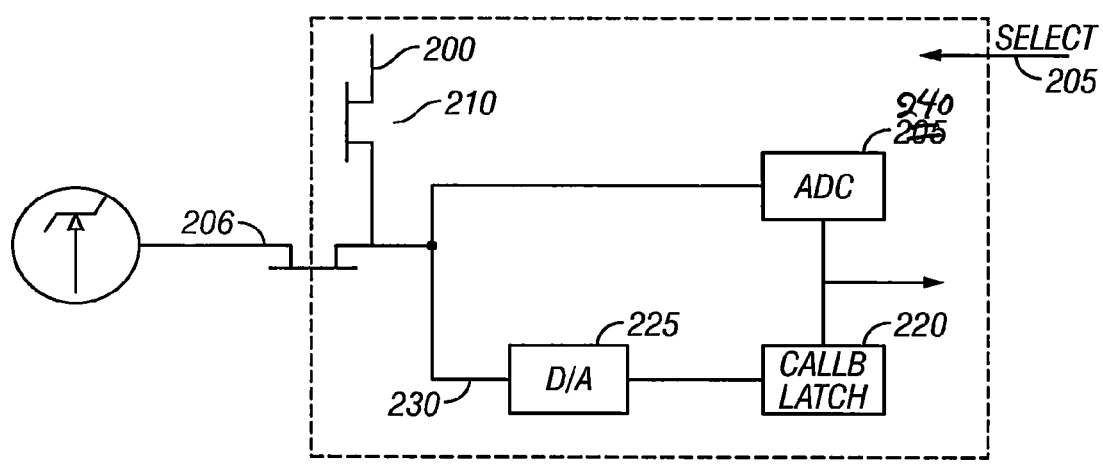
FIG. 2 shows a layout of an individual element of the readout circuit.

FIG. 2 illustrates an exemplary conversion circuit 122. A conversion is actuated responsive to a select signal 205 becoming active. The select signal may be produced by controller 150, for example. The image sensor is reset between select signals, and may be accumulate photogenerated charge between select signals.

During each time while the select signal 205 is inactive, a known value, such as a value from a voltage reference 206, is injected into the A/D converter. Preferably, this known value is the same for each of a plurality of pixels. The known value may be from a common source 206 for all the readout signals, for example, or may be a conversion of optical black or ground level. The output of the A/D converter 240 is obtained and this output is latched into a calibration latch 220, and then D/A converted by a D/A converter 225. D/A converter 225 creates a calibration level 230. Calibration level 230 is summed with the output of the source follower 210 at the summing node 235. Hence, the calibration level 230 becomes an offset to the A/D converter 205. Since each A/D converter of each output circuit 120 converts the same level, all of the A/D converters are presumed to be equalized.

The calibration value is obtained before each sample. In one embodiment, calibration is carried out before obtaining both sample and reset levels.

Since results are individually obtained for each row, any noise that is not fixed is in effect randomized. It is believed that as long as the random noise is less than ⅓ of the RMS value of the signal, that the randomization of the noise will be much less noticeable.

Figure 3:
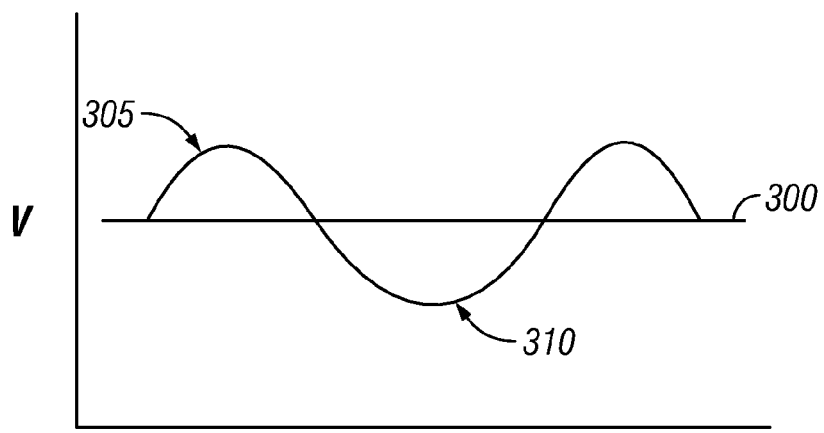
FIG. 3 illustrates one of the concepts on which the noise reduction system is based.

Systems which rely on calibration assume that the calibrating voltage value is an ideal value 300 shown in FIG. 3 for reducing offsets in the circuit. However, the inventors recognize that there is actually two different components of the noise—both the fixed noise, and the varying noise, e.g., slowly varying noise. FIG. 3 shows noise on top of the value 300, shown in exaggerated form as 305 in FIG. 3.

The inventors postulate that the calibration value time varies over time according to the noise level. If the sample value is obtained at position 310, it will be different than the sample value that is obtained at the position 315.

Unexpectedly, therefore, calibrating more often therefore does not necessarily reduce the fixed portion of the noise; however, it does make the noise more random and hence less noticeable.

Another aspect of this system embodiment is that since the calibration is carried out at each readout cycle, the calibration latch 220 does not need to hold the value as long. In fact, the calibration latch only needs to hold the value for one more time in this embodiment. In order to allow some spare capacity, the calibration latch should be sized to hold the calibration value 230 for the time of sampling of at least two or three rows. However, the calibration latch does not need to hold the value for an entire frame. Previous digital calibration latches which calibrated every frame, for example, needed to hold the values for a longer period of time, and therefore may have taken up more real estate on the chip. In addition, the latch's value started to degrade over time, and that itself could add fixed pattern noise to the signal.

A controller 150 can also control all of the different levels in the different signals that are used by this system. The controller controls the operation according to the flowchart of FIG. 4. It should be understood, however, that the flowchart of FIG. 4 need not necessarily be effected via software, but rather can be affected be a hardwired logic.

Figure 4:
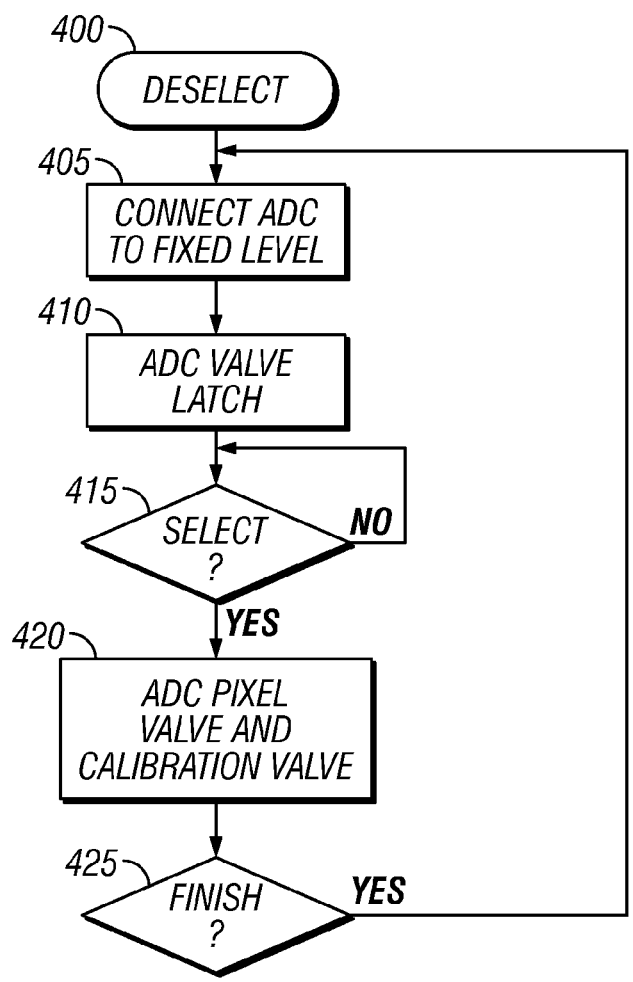
FIG. 4 shows a flowchart of operation of a controller.

FIG. 4 begins in a state presumably where the output circuit such as 122 is deselected at 400. At 405, the A/D converter 205 is connected to a fixed level 206. 410 proceeds to output the value from the A/D converter and to latch it into the calibration latch 220. The output of the calibration latch is also D/A converted, and the calibration level 230 is applied to the summing node 235. After this calibration, the system is monitored to determine if it is selected at 415. Once the unit is selected at 415, a pixel value has been applied to the input of the source follower 210, and that output is summed with the calibration level on the summing node 235. A/D converter 205 then begins its A/D conversion at 420. The A/D conversion represents the pixel value added to the calibration amount. The A/D conversion finishes at 425, at which time control again passes for 400 to again calibrate the A/D converter for the next conversion. At this time, the system may also wait until it is deselected at 400.

Another embodiment may carry out the calibration less often, e.g., every nth row, where n can be 2 or 3 or 4. Another embodiment may carry out the calibration every 2n rows, e.g., every second, fourth or eighth row. Different embodiments may carry this out on different numbers of rows.

The general structure and techniques, and more specific embodiments which can be used to effect different ways of carrying out the more general goals are described herein.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

For example, while the above has described column parallel architectures, this same system could be used in any other kind of architecture. Also, while the above has described active pixel sensors and MOS sensors, this could be used with other kinds of sensors including CCDs, as well as any sensor that uses any other kind of photosensor technologies such as photogates or the like.

While the embodiments discloses specified rows and/or times for obtaining the calibration values, the values can be obtained at any times or number of rows, so long as they are in in effect random relative to each other in order to randomize the noise on the calibration values relative to one another. For example, as another alternative embodiment, there may be a random process or random number generator that determines randomly when to calibrate the rows. In this embodiment, every r rows are calibrated, where r is random or pseudorandom.

Also, the inventor intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An image sensor system, comprising:
an array of image sensor pixels;
a readout system, associated with said array of image sensor pixels, said readout system including plural readout elements, each readout element including an A/D converter producing a digital value indicative of its input, and including a connection part that selectively connects the readout system to receive outputs from said image sensor pixels,
said readout system including a calibration part that connects a calibration value to said A/D converter at a first time in order to calibrate an output of said A/D converter, and a calibration latch that stores a digital calibration value produced from said A/D converter when said calibration part has connected said calibration value thereto and uses said A/D converter to sample values from said image sensor pixels at a different time from said first time, and to use said digital calibration value from said calibration latch to produce an output by combining a value from an output of said A/D converter sampling a value from an image sensor pixel, along with said read out digital calibration value; and
a controller, that controls said readout system to receive outputs from different image sensor pixels at different times, and controls said calibration part to obtain calibration information each time that said readout system is used to read out a value and indicative of any image sensor pixel and use to said calibration information for said each time that said readout system is used, to compensate for said each readout,
wherein said controller obtains said calibration information on only some, but not all rows, and wherein said controller selects randomly rows to be calibrated.

2. A system as in claim 1, wherein said readout system is a column parallel readout system, with one readout element for each column of the image sensor array.

3. A system as in claim 2, wherein said controller controls said calibration part to obtain said calibration value each time a row is read out by said readout system.

4. A system as in claim 1, wherein said calibration latch is sized to store said calibration value for a time less than a time necessary for readout of the entire array.

5. A system as in claim 1, wherein said calibration latch is sized to store said calibration value for a time less than the time necessary to read out three pixels.

6. A system as in claim 1, wherein said calibration part includes a connection to a fixed value.

* * * * *